United States Patent [19]

Meyer

[11] 3,885,436
[45] May 27, 1975

[54] TEMPERATURE DETECTING SYSTEM

[75] Inventor: Charles A. Meyer, Media, Pa.

[73] Assignee: Westinghouse Electric Corp., Pittsburgh, Pa.

[22] Filed: Oct. 2, 1973

[21] Appl. No.: 402,685

Related U.S. Application Data

[63] Continuation-in-part of Ser. No. 160,649, July 8, 1971, abandoned.

[52] U.S. Cl. ............... 73/339 A; 73/340; 73/349
[51] Int. Cl. .......................................... G01k 11/24
[58] Field of Search .......... 73/339 A, 340, 349, 357

[56] References Cited
UNITED STATES PATENTS

| | | | |
|---|---|---|---|
| 2,582,232 | 1/1952 | Cesaro et al. | 73/339 A |
| 3,022,670 | 2/1962 | Sutliffe | 73/349 X |
| 3,399,570 | 9/1968 | Pirlet | 73/339 A |
| 3,470,743 | 10/1969 | Steinberg | 73/339 A X |
| 3,483,750 | 12/1969 | Pratt | 73/349 |
| 3,585,858 | 6/1971 | Black | 73/339 A |
| 3,623,367 | 11/1971 | Benedict | 73/349 X |
| 3,706,227 | 12/1972 | Gottron et al. | 73/339 A |

FOREIGN PATENTS OR APPLICATIONS

| | | | |
|---|---|---|---|
| 1,512,875 | 1/1968 | France | 73/339 A |

*Primary Examiner*—Richard C. Queisser
*Assistant Examiner*—Frederick Shoon
*Attorney, Agent, or Firm*—F. J. Baehr, Jr.

[57] ABSTRACT

A temperature indicator apparatus and method for determining the fluid medium temperature in a fluid stream. An acoustical device is disposed in the flow path of the fluid stream, which device is actuated by the flowing fluid medium to generate sound of a particular frequency as a function of the sonic velocity of the fluid. Sound detecting means are disposed in position to sense the generated sound and to determine the frequency of the sound. The sonic velocity of the fluid is a function of the fluid temperature. The fluid temperature is thus determinable from the frequency of the sound generated.

3 Claims, 6 Drawing Figures

3,885,436

TEMPERATURE DETECTING SYSTEM

This is a continuation-in-part of application Ser. No. 160,649, filed July 8, 1971, now abandoned

BACKGROUND OF THE INVENTION

The measurement of the fluid temperature of high temperature flowing fluids presents many technical problems. High temperature, high velocity fluids are utilized in numerous important industrial and commercial applications including steam and gas power plant turbines, and jet and turbine propulsion systems.

Electrical devices such as thermocouples and hot resistance wire thermometer devices are the most commonly employed temperature indicators presently used. A working temperature of from 1,000° to 2,000°F. would not be uncommon in devices such as electric power plant gas turbines, with the higher temperature at the combustor. The reliability of the electrical sensors under such high temperatures disposed in a sometimes turbulent high velocity fluid stream is less than ideal. The need to provide many such sensors because of their failure rate and the maintenance involved in replacement is bothersome. Such electrical sensors inherently only provide an average of the temperatures measured at a finite number of points in the stream. A thermocouple temperature detector inherently involves serious conduction and radiation losses which complicates its usage in a hot, fluid stream.

The generation of resonant sound by first generating an acoustical disturbance or vibrations and transmitting the vibrations to a resonant system to generate resonant sound is well understood. The acoustical disturbance or sound wave can be initially generated by, for example, passing a stream of fluid or gas over a sharp edge or by using the gas stream to move a thin reed which is disposed over an orifice to a resonant body. The resonant sound generated will have a distinct frequency dependent on the nature of the acoustical body, so that, for example, for an organ pipe the frequency $f$ is, $f = (n/4)(a/L)$, where $n$ is an integer which is even when both ends of the pipe are open or closed, and $n$ is odd when one end of the pipe is closed. The integer $n$ has a multiplicity of values which accounts for the higher harmonics of the generated sound. The symbol $a$ represents the sonic velocity of the medium or the velocity at which sound is transmitted through the medium, which for an organ is air, and $L$ is the length of the pipe.

It is also, of course, well known that the sonic velocity $a$ of a gaseous medium is a function of the temperature of the medium, so that the sonic velocity $a$ can be expressed as $a = \sqrt{g\gamma R T}$ where $g$ is the gravitation constant, $\gamma$ is the ratio of the specific heat of the gaseous medium at constant pressure to the specific heat at constant volume, $R$ is the gas constant for the particular gaseous medium, and $T$ is the absolute temperature of the medium. Therefore, $$f = \frac{n}{4} \frac{a}{L} = \sqrt{\frac{n\ g\gamma RT}{4L}}$$

or $$T = \left(\frac{4Lf}{n}\right)^2 \frac{1}{g\gamma R}.$$

DESCRIPTION OF THE PREFERRED EMBODIMENTS

Figure 1:
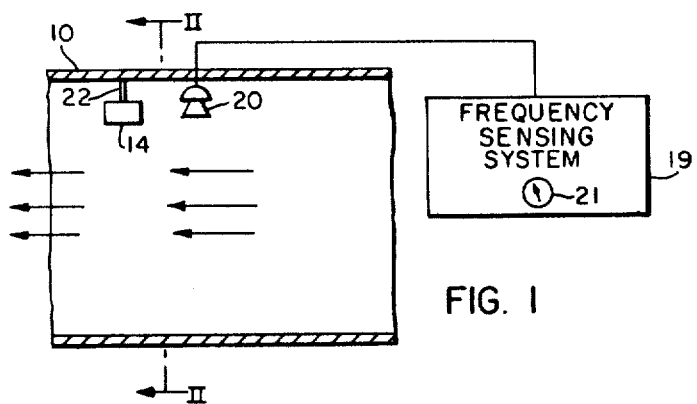
FIG. 1 is a simplified elevational representation of a portion of a gas-turbine used in the generation of electrical power, in combination with the temperature detecting system of the present invention.

Referring to FIG. 1, there is shown a fluid carrying conduit 10. The conduit 10 carries any suitable fluid, moving in a stream, as indicated by the arrows and more specifically hot motive fluid moving at high velocities, although the fluid is not limited thereto.

A resonant sound generator 14 is disposed in the fluid stream path. The resonant sound generator 14 shown generally in FIG. 1 and in enlarged detail in FIG. 3, comprises an acoustical vibration producing means 15, which can be for example a directing orifice 16 through which a portion of the fluid stream is directed to move the fluid medium over a sharp edge 17, such as is well known in organ pipes or other wind instruments. A reed setup and other equivalent elements can also be utilized as the acoustical vibration producing means 15. The vibrations produced are transmitted to the acoustically coupled resonant system or chamber 18, which is here shown in FIG. 3 as a tube or pipe connected to the vibration producing means 15. The tube or pipe can have an open or closed end portion, but in any case there should be sufficient communication with the fluid stream such that the fluid medium within the pipe is in substantial equilibrium with the flowing fluid medium, which is here high velocity, hot motive fluid. This is to insure that the fluid medium in the sound generator 14 is representative of the fluid medium in the entire system, so that the temperature results attained accurately reflect the mass flow average value.

A resonant sound sensing system 19 is disposed within range of sensing the sound at any convenient location within or outside of the conduit 10. The pipe dimensions can be easily designed so that the frequency of sound is in the audible range, with resonant sound being produced when a particular high temperature value is attained to act as an auditory warning system.

The resonant sound system 19 includes sound sensing means such as microphone 20 connected with a conventional electrical tuning circuit (not shown) and frequency meter 21 for determining the frequency of the resonant sound. The microphone 20 converts the sound to an electrical signal which retains the characteristic frequency, and this signal is fed to a frequency meter 21 which is calibrated to indicate the temperature of the fluid medium.

The frequency meter 21 may be calibrated in any suitable manner, as well known to those skilled in this art, to correlate the sonic velocity of the fluid medium and the frequency to provide temperature values of the fluid according to previously defined equation $$T = \left(\frac{4Lf}{n}\right)^2 \frac{1}{g\gamma R}$$

Figures 2, 3:
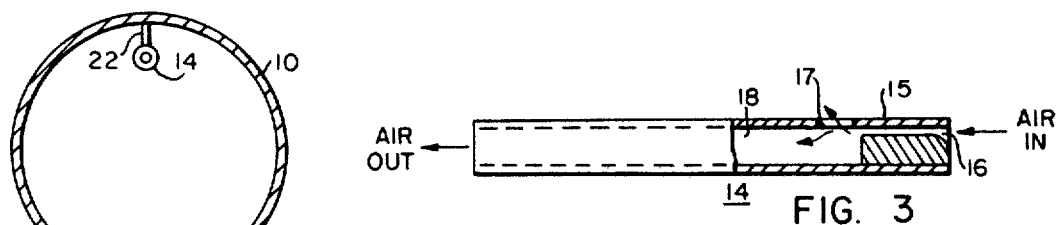
FIG. 2 is a section taken through the adaptor section shown in FIG. 1 showing where the resonant sound generator is disposed.
FIG. 3 is an enlarged side view of the resonant sound generator shown in FIG. 1 and FIG. 2.

The resonant sound generator 14 is shown in FIG. 2 in a view taken along line II-II in FIG. 1, transverse to the flow path. A support member 22 connects the resonant sound generator 14 to the wall of the conduit 10. A plurality of such resonant generators 14 could be disposed in the fluid stream to allow for temperature determination at a number of locations.

Figure 4:
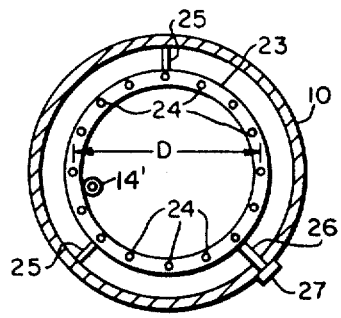
FIG. 4 is a sectional view similar to FIG. 2 showing another embodiment of the resonant sound generator.

In another embodiment of the invention shown in FIG. 4, an annular tube 23 of toroidal shape is used as a portion of the resonant sound generator. The annular tube 23 is coupled to an acoustical vibration producing means 14', and is provided with a plurality of apertures 24 to insure an accurate sampling of the fluid medium, so that the fluid medium within the annular tube is representative of, and is in substantial equilibrium with the fluid medium of the stream. Support members 25 support the annular tube 23 concentrically within the conduit 10. For this configuration of resonant system, the resonant frequency is $f = (n/4) (a/D)$ where $n$ is again an integer, $a$ the sonic velocity of the fluid medium, and $D$ the diameter of the annular tube taken from the midpoint between the interior and exterior diameter of the tube 95 indicated in FIG. 4.

In certain applications, such as gas turbines, it is not unusual for the temperature profile of the gas stream to be non-uniform, and this embodiment of the resonant system is designed to have means for continuously draining fluid from the tube 23 to sample the fluid medium from throughout the flow path to get an accurate mass flow average temperature. The drain means may comprise drilling certain of the holes 24 all the way through the tube, or the hole 24', which forms a portion of the sound generating means, may also function as drain means.

An alternate way of determining the frequency of the resonant sound is shown in FIG. 4 wherein a pick-off tube 26 extends from the annular tube 23 to the wall of the conduit 10. The pick-off tube 26 communicates with the interior of the annular tube 23 through an aperture in the wall of the annular tube. A transducer 27, which is sensitive to acoustical pressure, is disposed at the conduit wall at the end of the pick-off tube 26. The resonant sound generated in the sound generator 23 produces pressure waves in the pick-off tube 26 which have a similar frequency. These pressure waves are sensed by the transducer 27 and the frequency is easily measured or indicated on a frequency meter which is again calibrated to read the temperature of the fluid medium.

Figure 5:
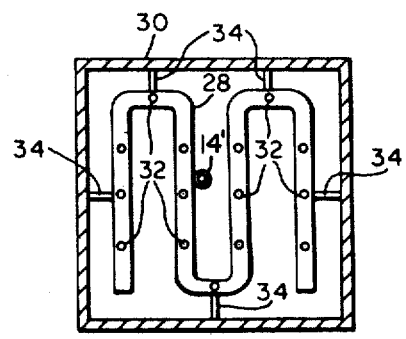
FIG. 5 is a view similar to FIG. 4 but showing another embodiment for the resonant sound generator.

In another alternative embodiment shown in FIG. 5 is a cross sectional view showing a channel 30 of rectangular cross section having a resonant sound generator 28. The sound generator 28 is a tubular member or conduit having a plurality of apertures 32 and is coupled to acoustical vibration producing means 14'. The sound generator 28 is supported within channel 30 by supports 34. The generator 28 is generally of sinuous shape and is provided with means for continuously draining fluid from the conduit 28 to provide an accurate mass flow temperature average. The drain means may comprise drilling a certain number of the holes 32 all the way through the conduit 28, or the hole 24' may also function as drain means.

Figure 6:
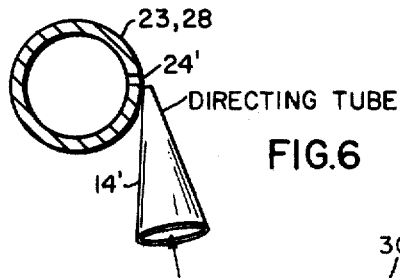
FIG. 6 is a partial sectional view of acoustical vibration producing means.

FIG. 6 shows means for producing an acoustical vibration of a single frequency, coupled with the tubular member 23 or 28 and comprises a tube 14' disposed so that one end thereof is adjacent a hole 24' in the tubular member 23 or 28. This is a very simple means for producing an acoustical vibration and it is intended that other simpler or more complicated acoustical vibration means may be utilized.

The invention has been generally described for use in any fluid conduit, but has specific applications in measuring the temperatures of fluid streams in turbines. It will be obvious to those skilled in the art that many modifications can be made in the above described embodiments without departing from the spirit and scope thereof, and therefore it is intended that all the matter contained in the foregoing description or shown in the accompanying drawings shall be interpreted as illustrative and not in a limiting sense.

What is claimed is:

1. A system for indicating the average temperature of a fluid flowing through a duct, said system comprising a conduit disposed generally wholly within said duct, said conduit having a plurality of apertures disposed therein to admit fluid from substantially all portions of said duct, said conduit also having an opening disposed therein to provide constant drainage of fluid therefrom, whereby the fluid in said conduit is representative of a crosssection of the fluid in the duct, means for producing an acoustical vibration within said conduit, the frequency produced by said acoustical vibration producing means being a function of the sonic velocity of the fluid within the conduit, and means for sensing the frequency of said acoustical vibration within said conduit and converting said frequency to a temperature indication, whereby, immediately, a very accurate average fluid temperature is indicated.

2. The system as set forth in claim 1, wherein the conduit is toroidally shaped.

3. The system as set forth in claim 1, wherein the conduit is sinuously shaped.

* * * * *